United States Patent
Whatley et al.

[19]

[11] Patent Number: 6,116,838
[45] Date of Patent: Sep. 12, 2000

[54] MECHANICAL HAY DISTRIBUTOR

[76] Inventors: Robert T. Whatley; John Scott Sparks, both of P.O. Box 233, Hennepin, Okla. 73444

[21] Appl. No.: 09/434,374

[22] Filed: Nov. 5, 1999

Related U.S. Application Data

[63] Continuation-in-part of application No. 09/247,873, Feb. 11, 1999, Pat. No. 5,997,233.

[51] Int. Cl.$^7$ ...................................................... B60P 1/00
[52] U.S. Cl. ........................... 414/25; 414/509; 414/515; 414/518
[58] Field of Search ............................ 414/25, 501, 503, 414/504, 505, 509, 510, 513, 514, 515, 516, 518, 521, 523

[56] References Cited

U.S. PATENT DOCUMENTS

| | | | |
|---|---|---|---|
| 862,597 | 8/1907 | Wilson | 414/514 |
| 966,572 | 8/1910 | Miller. | |
| 1,079,211 | 11/1913 | Campbell. | |
| 1,261,997 | 4/1918 | Anderson. | |
| 3,047,174 | 7/1962 | Kasten | 414/503 |
| 3,622,024 | 11/1971 | Grey et al. | 414/509 |
| 3,675,802 | 7/1972 | Best et al. | 414/503 |
| 3,688,919 | 9/1972 | Snider | 414/505 |
| 3,722,722 | 3/1973 | Blair | 414/505 |
| 3,754,388 | 8/1973 | Neely, Jr. | 414/505 |
| 3,884,367 | 5/1975 | Butler et al. | 414/501 |
| 4,008,818 | 2/1977 | Neely, Jr. | 414/505 |
| 4,042,140 | 8/1977 | McFarland. | |
| 4,044,963 | 8/1977 | Hostetler | 414/505 |
| 4,078,677 | 3/1978 | Huggins, Jr. et al. | 414/514 |
| 4,170,426 | 10/1979 | White et al. | 414/518 |
| 4,573,845 | 3/1986 | Carpenter | 414/515 |
| 4,789,289 | 12/1988 | Wilson | 414/505 |
| 5,135,343 | 8/1992 | Wigness | 414/24.5 |
| 5,352,080 | 10/1994 | Bakke | 414/24.5 |
| 5,441,377 | 8/1995 | Cataldie, Jr. | 414/437 |
| 5,470,175 | 11/1995 | Jensen et al. | 414/505 |
| 5,855,466 | 1/1999 | Faulkner et al. | 414/505 |

FOREIGN PATENT DOCUMENTS

154372  4/1932  Switzerland.

*Primary Examiner*—Janice L. Krizek
*Attorney, Agent, or Firm*—Richard C. Litman

[57] ABSTRACT

An improved hay distributor is provided that distributes large rectangular hay bales or flakes of hay, operating on a conveyor principle wherein the bales are slowly advanced from the bed of the vehicle to its edge as the vehicle is driven, whereupon by mechanical action the bale is cleaved to flake. A stabilizer rod maintains the bale in compact form prior to flaking, and a base plate is provided, forming a point of retrofit attachment of the main frame of the distributor to the vehicle bed. The base plate provides a mounting support for converting between side distribution of hay from the bed of the vehicle. Next, an operating main frame includes a) rails, having an initial end and a terminal end, along which a hay bale is advanced, and b) incline-adjustable ramps disposed in the path of the rails at their terminal ends, over which the bale advances on its approach to the edge of the bed of the vehicle, which ramps cause natural cleavage of the bale into individual flakes by creating a line of stress. The flakes thus fall off the edge of the vehicle bed via a loading portal which is swingably and releasably mounted to the bed of the vehicle to reduce unnecessary physical exertion by a lone operator.

19 Claims, 4 Drawing Sheets

MECHANICAL HAY DISTRIBUTOR

CROSS-REFERENCE TO RELATED APPLICATION

This application is a continuation-in-part of the U.S. Non-provisional application Ser. No. 09/247,873 filed on Feb. 11, 1999, now U.S. Pat. No. 5,997,233.

BACKGROUND OF THE INVENTION

1. Field of the Invention

The present invention relates to a mechanical hay distributor. More specifically, the invention is an improved vehicle-mounted conveyor which mechanically distributes discrete amounts of hay from bales of hay, preferably rectangular bales, thereby allowing a lone user to selectively and efficiently distribute hay over large agricultural areas from a moving vehicle.

2. Description of Related Art

Many farmers feed large rectangular bales of hay to their livestock during the winter and fall. Large rectangular bales of farmer. For example, storage of large rectangular bales is easier and more efficient than large round bales. A large rectangular bale can be separated and easily broken-up proportionally to a predetermined number of animals in a pasture, while a large round bale can not be broken-up as easily and must be used in whole bale increments, thereby wasting hay. Large rectangular bales are also easier to haul by the load, and, unlike round bales, feasible to be loaded by a lone individual due to reduced size and weight. All these advantages make large rectangular bales more economical for feeding than large round bales.

Even though large rectangular bales have so many advantages, they are far more labor intensive to handle during the feeding distribution process than the large round bales, thus contributing to increased labor cost and expenses, reducing profit margins for the farmer. When distributing the large rectangular bales, the user typically must first load multiple bales on the back of his truck. The user then proceeds to the pasture, stops the truck, gets out of the truck, climbs in the back of the truck, separates some sections or flakes of hay from the bale and throws the hay to the livestock in the pasture. The user then gets back into his truck, drives a little further in the pasture and repeats the process again. When the user has a large pasture of land and a large number of animals to feed, this can be a very slow, very time consuming and tedious process. In the alternative, hands must be hired to expedite the process.

Some farmers have tried other dangerous, alternative methods of distributing hay. Farmers have been known to put their truck in low gear, jump out of the truck, jump in the back of the slow moving truck and throw hay to the livestock while the truck is moving, unmanned. Some farmers have also tried similarly to walk or run on the side of an unmanned truck while it is moving. Some farmers will have one person driving the truck and another riding in the back of the truck throwing off flakes of hay in the pasture while the truck is moving. This not only takes up the time of two men, but is also unsafe since a person is typically unstable while standing in the back of a moving truck.

Several related art patents disclose mechanical hay distributors that distribute round bales of hay. McFarland, U.S. Pat. No. 4,042,140, describes a self-loading trailer which handles and unloads large round bales of hay by means of fork-lift arms, and Wigness, U.S. Pat. No. 5,135,343 describes a handling device comprising of a spearing frame which attaches to the back of a pick-up truck and rolls out a large round bale of hay. At this time, the only way to unload a large rectangular bale of hay is to use a front end loader. Moreover, there is currently no device that will safely and efficiently allow a person to mechanically flake off or unload large bales of hay from the back of a truck.

Other hay distributors for merely dumping hay bales include the patents issued to Miller (U.S. Pat. No. 966,572) and Cataldie, et al. (U.S. Pat. No. 5,441,377, describing a sliding apparatus which pushes a bale of hay over a ramp from a trailer). Hay spreaders for use under a barn roof are described by Campbell in U.S. Pat. No. 1,079,211, by Anderson in U.S. Pat. No. 1,261,997, and in Swiss patent number 154,372. A hay baler and wrapper is seen in U.S. Pat. No. 5,352,080 to Bakke.

None of the above inventions and patents, taken either singly or in combination, is seen to describe the instant invention as claimed.

SUMMARY OF THE INVENTION

Accordingly, it is a principal object of the invention to provide an improved hay distributor that distributes flakes of hay bales, operable by a single individual while operating a truck or vehicle mounted with the present invention.

The invention is a hay distributor that distributes large rectangular hay bales or flakes of hay, operating on a conveyor principle wherein the bales are slowly advanced from the bed of the vehicle to its edge as the vehicle is driven, whereupon by mechanical action the bale is cleaved to flake. A hay flaking stabilizing bar provides continuous distribution of hay flaking without hay back- drop or retrograde along the bed or conveyor of the vehicle. The hay distributor comprises several major and basic components, illustrating several advantages. First, a base plate is provided, forming a pivoting point of retrofit attachment of the main frame of the invention to the vehicle bed. The base plate provides a mounting means for conversion of the incention between side or rear-end distribution of hay from the bed of the vehicle. Next, an operating main frame comprises a) rails, having a initial end and a terminal end, along which a hay bale is advanced, and b) incline-adjustable ramps disposed in the path of the rails at their terminal ends, over which the bale advances on its approach to the edge of the bed of the vehicle, which ramps cause natural cleavage of the bale into individual flakes by creating a line of stress. The flakes thus fall off the edge of the vehicle bed, without operator assistance. A skid assembly travels on the rails to drive the bales, and, a remotely-operated motor unit drives the skid assembly. The motor unit may employ a) a winch mounted to the vehicle bed remote from the operating frame and 2) a cable and pulley assembly to transfer drive forces to the skid assembly.

In the preferred embodiment, additional components include an adjustable fence for guiding the hay bale along the rails, thus accommodating a variety of rectangular hay bale sizes. A loading portal is vertically swing-mounted to the terminal end of the operating main frame, providing a gate-like open frame for support of a striking device which assists in the cleavage of the bale and provides consistent flake sizes. The striking device of the preferred embodiment is a motor-driven paddlewheel having rigidly attached flail arms, the paddlewheel horizontally and rotatably mounted on the open frame above the ramps, the frame is spaced to permit the flail arms to strike the top surface of a bale as it passes below. As a consequence, the loading portal according to the improved embodiment includes only height-adjustment mechanisms to permit adjustment of the opening of the frame to correlate with the desired paddlewheel and fence positions. In addition, the frame of the loading portal has been modified to include rectangular stud male members which insertably attach to corresponding rectangular female members mounted within the bed of a vehicle. This particular attachment feature eliminates rotation at the male and female bed connections, particularly when the frame is rotated away from the bed with respect to a single perpendicular axis depending therefrom.

For secure transportation of hay bales to and from a feeding area, a retaining arm is attached to the terminal end of the main frame. The retaining arm is positioned to be rotated from a storage position below the terminal end of the rails to an up position, which occludes the opening of the frame to prevent hay bales from unintentionally escaping from the load during transportation.

Thus, the hay distributor is adapted to distribute large rectangular bales individually or, in its preferred use, to flake off sections. The hay distributor can be used off the back of a pick-up truck or used on the sides or back of a flat bed truck. In operation, an operator of the vehicle remotely selects an on position for either of both of the winch motor and paddlewheel motor, choosing to run the motors continuously on, or, as a pulse operation to allow selective delivery of the flakes at desired locations. The winch pulls the cable attached to the skid assembly, thus advancing the bale load by sliding them over the rails. A bale stabilizer rod maintains a terminal bale in compact form when the bale load approaches the motorized rotating paddlewheel at the top of the frame. The paddlewheel strikes the top of the moving bale and flakes off sections of hay from the bale at the cleavage line caused by the ramps. The hay distributor permits a single worker to safely drive a truck and distribute hay simultaneously.

It is a further object of the invention to provide a hay distributor that can be used to distribute hay off the back of a pick-up truck or off the sides or back of a flat bed truck.

Another object of the hay distributor is to permit a single worker to safely drive a truck and distribute hay at the same time.

Another object is to provide a hay distributor that is convertible between uses to distribute hay bales whole or in flakes off the back of a truck in compact form, and with reduced physical labor by a lone user.

Still another object of the invention is to provide a hay distributor having a loading portal frame which is structurally rigid and simple to manipulate or rotate via a single user.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is directed to an improved hay distributor which stabilizes hay in compact form prior to flaking along a conveyor. The preferred embodiment of the present invention is depicted in FIGS. 1–4, and is generally referenced by numeral 11.

As diagrammatically illustrated in FIGS. 1–4, the improved hay distributor 11 is shown distributing large rectangular hay bales B or flakes F of hay, operating on a conveyor principle wherein the bales B are slowly advanced from a vehicle bed VB to its edge E' as the vehicle V is driven, whereupon by mechanical action the bale B is cleaved to flake.

The hay distributor 11 comprises several major operational components, namely, a base or bed plate 20', a main frame 30 optionally pivotally mounted to the base plate 20', a skid assembly 40' reciprocally disposed on the main frame 30, and a motor unit 50' for driving the skid assembly 40'. Additional components which improve operation of the basic invention, later described and included in the preferred embodiment of the invention, include a loading portal 70' swing-mounted to the bed or base plate 20' thereby providing sufficient support for a motor-driven paddlewheel 80 which assists in the cleavage of the bale B and provides consistent sizes of flakes F.

Figure 1:
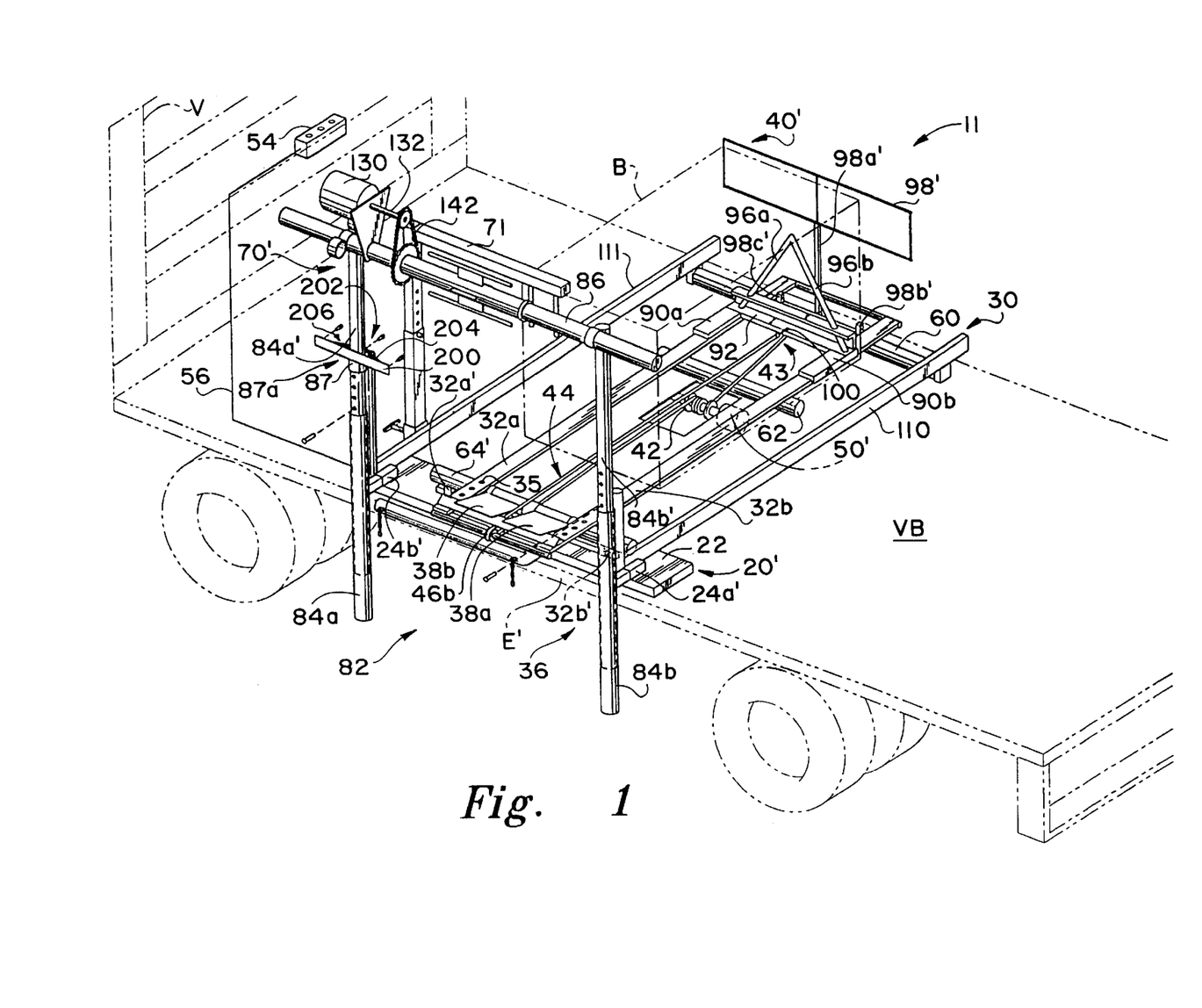
FIG. 1 is an environmental, largely diagrammatic perspective view of a mechanical hay distributor according to the present invention exemplifying its major components.
Figure 2:
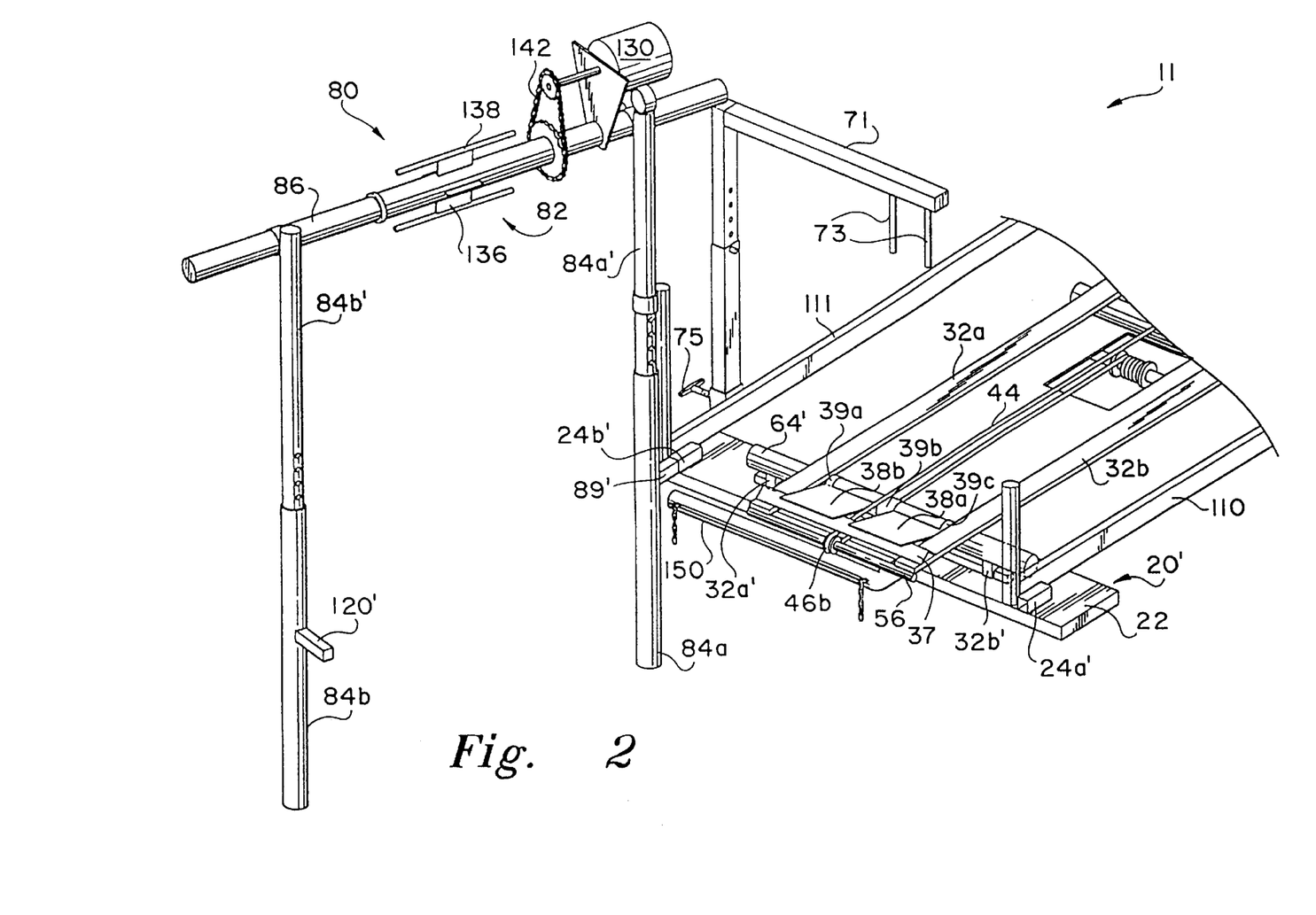
FIG. 2 is a perspective, partial view of a mechanical hay distributor according to the present invention, illustrating the swinging frame in a partially opened position with non-rotatable rectangular supports.
Figure 3:
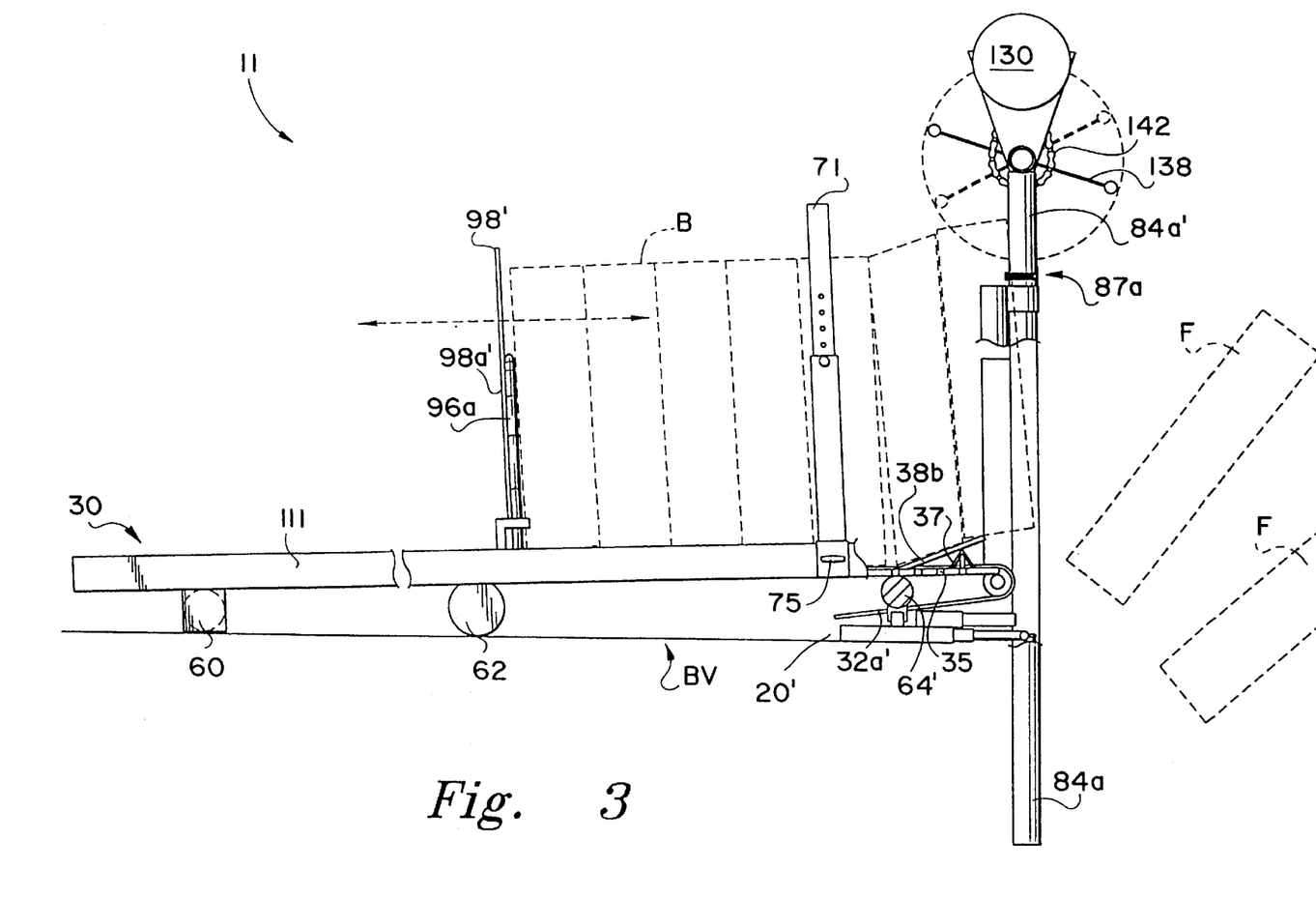
FIG. 3 is a perspective partial side view of a mechanical hay distributor according to the present invention, illustrating the hay flaking stabilizer and operation of the paddlewheel and ramps.

The base plate 20' forms an optional pivoting point of retrofit attachment of the main frame 30 to the vehicle bed VB. In the preferred embodiment, the base plate 20' provides a mounting means for conversion between side or rear-end distribution of hay from the bed VB of the vehicle and for mounting the loading portal 70' thereon as a more structurally stable attachment. As seen in FIG. 1, the base plate 20' is shown mounted to a side edge of the vehicle bed VB. The base plate 20' comprises a top planar portion 22', optionally flanged to abut the side of a flatbed as contiguous attachment shown in FIG. 1, or mounted directly to the flatbed, by welding, bolting or other secure means. Depending upwardly from the base plate 22' are two rectangular collars 24a', 24b' which permit the loading portal 70' to be mounted thereto from near its terminal end 36 (corresponding to the terminal end 36 of rails 32a, 32b). The rectangular collars 24a' and 24b' are disposed on the vehicle bed VB to alleviate rotation normally associated with attachments germane to cylindrically shaped journal collars. This permits the entire loading portal 70' lifted clear off the vehicle bed VB or partially off the bed as a pivoting structure diagrammatically illustrated in FIG. 2.

The main frame 30 comprises rails 32a, 32b, having an initial end 34 and a terminal end 36, over which a hay bale B is advanced, the rails 32a, 32b tied together by a plurality of support braces, including first brace 60, second brace 62, and a non-pivoting brace 64'. The first and second brace 60, 62 rest freely upon the vehicle bed VB, and, each brace is attached transversely to the rails 32a, 32b. The non-pivoting brace 64' includes rectangular tubing members 32a' and 32b' which insertably attaches to either base plate 20 or directly on the vehicle bed VB via transversely disposed male type rectangular rails or prongs 31a,31b, thus connecting the main frame 30 to the base plate or bed via members 32a' and 32b' respectively. This permits the entire main frame 30 to be lifted clear off the vehicle bed VB for access to dedicated parts of the bed, such as trapdoors to access goose neck trailer receivers and the like, when the motor unit 50 or winch has been deactivated. Incline-adjustable ramps 38a, 38b are disposed in the path of the rails 32a, 32b at their terminal ends 36, over which the bale advances on its approach to the edge E'. In the preferred embodiment and as more clearly seen in FIGS. 3 and 4, each ramp 38a, 38b is rotatably mounted on the non-pivoting brace 64' by means of a plurality of sleeves 39a, 39b, 39c. In the preferred embodiment, materials such as a cylindrical steel tube of a first inner and outer diameter (e.g 3 inch o.d.) may be used to manufacture the non-pivoting brace 64', whereas sleeves 39a, 39b, 39c would each be made of a cylindrical steel tube of second inner and outer diameter (e.g. 3 inch i.d.), the second inner diameter approximating the first outer diameter. Each of ramps 38a, 38b are affixed to the sleeves 39a, 39b, 39c in a co-planar relationship to one another, thus forming an integral unit which causes ramps 38a, 38b to rotate in unison and both have the same angle of incline when rotated. Other options can include wherein the motor 50' and cable assembly is mounted above the bed rather than below the bed via the aperture 49 which illustrates the motor mounted below the bed thereby maximizing available space above the bed without the need for special mounting structures or extensions to provide specific operative clearances. In either case, it would be obvious to one having ordinary skill in the relevant art to provide either arrangement depending on the intended use of the device.

It should be understood that the configuration of the preferred ramp unit is intended to permit the cable 44 to pass between the ramps 38a, 38b, to be attached to a central portion of the skid assembly 40' ; however, in alternative embodiments, the dual ramps may be eliminated by simply rerouting the cable 44, or by using a different drive means to advance the skid assembly 40', such as worm gear drive unit disposed either above or below the vehicle bed VB.

Likewise, it should be understood that other embodiments employing a fixed-incline ramp may be developed without departing from the scope of the presently claimed invention. In fact, prototypical development of the preferred embodiment showed that a fixed-incline ramp was effective in causing a stress line to develop in a bale of hay thereby causing it to cleave by its own weight when a sufficient portion of the bale extended over the edge of the ramp. A fixed-incline ramp thus causes natural cleavage of the bale into individual flakes by creating a line of stress at the terminal edge of the ramp. The flakes thus fall off the edge of the vehicle bed, without operator assistance.

However, to fine tune the size and consistency of each flake of hay so cleaved, the improvement of incline-adjustable ramps was devised, in conjunction with the paddlewheel 80 and stabilizer bar 71, described in more detail later. Such improvements are significant to the use of various hay types, such as alfalfa hay or grass hay, which when baled, result in significantly differing compacting densities. For example, alfalfa hay bales often have higher density of packing, and thus are more difficult to cleave, thus making the preferred embodiment desirable.

The angle of incline of the ramps 38a, 38b is determined by means of a removable bar 37 on which the ramps 38a, 38b rest. As more clearly seen in FIGS. 2–4, the bar 37 of the preferred embodiment may be a simple angle iron, removably attached to each rail 38a, 38b by means of a simple hole and dowel arrangement. For each such arrangement, the bar 37 includes a dowel 33 bisecting the interior angle of the angle iron. Each rail 38a, 38b defines a series of spaced holes 35 uniformly sized to closely receive dowel 33, the holes positioned between the terminal end 36 and the brace 64'. Any predetermined number of dowels 33 attached to bar 37 should of course be aligned to be received by a like number of corresponding holes 35, each dowel 33 being of sufficient length and diameter to firmly seat within a corresponding hole 35. Thus, to change the incline of ramps 38a, 38b, the ramps may be rotated upwardly and the bar 37 advanced or retreated along the rails 32a, 32b and set in place, and the ramps lowered to rest on the bar 37. Preferably, adjustable ramps 38a, 38b have five settings of varying gradients which assist in the flaking of the bale 30, provided by a series of five holes 35.

The skid assembly 40' travels from the initial end 34 on the rails 32a, 32b toward the ramps 38a, 38b driving the bales B, and, a remotely-operated motor unit 50' drives the skid assembly 40'. The motor unit 40 may comprise an electric winch 42, diagrammatically illustrated in FIGS. 1 and 2, mounted anywhere to the vehicle bed VB or other remote position from the operating main frame 30. The winch 42 may include a mounting plate or rod for attachment to the vehicle bed VB. The winch 42 and/or motor unit 50' may be mounted above or below the vehicle bed VB, as desired, and is shown mounted below the vehicle bed for illustrative convenience. The electric winch 42 includes a remote control unit 54, including conventional circuitry, switches and wiring 56, to permit a remote user to operate the winch from the cab of the vehicle. The control unit 54 may include selective switch positions, including a continuously-on mode, a reverse mode, or, a pulse mode which allows the user to intermittently activate the winch 42. The operator may choose to activate the winch 42 for only a short duration and only when the vehicle is being operated in a hay delivery area, activated by a simple on-off switch. A mechanical counter 87a is also used to indicate when an operator should activate and deactivate the winch or respective motor unit 50'. The counter 87a is preferably mounted in orthogonal relation to one of the frame with members of the loading portal 70'. The counter is preferably a spring loaded bar mechanism which is rotatably activated by contact with a bale proximate 90 degrees so as to rotate the bar to indicate cleavage to an operator and the passing of a single flake from the portal 70' or conveyor as further discussed below.

When such a motor unit 50' is used to manipulate the conveyor or skid assembly along rails 32a, 32b, a cable and pulley arrangement accompanies the winch 42, wherein the cable 44 is attached at a first end 43 to the skid assembly 40 and at a second end 45 to the winch 42. A plurality of pulleys can be suitably arranged to transfer drive forces to the skid assembly 40 by means of the cable 44 such that the skid assembly 40 is moved from the initial end 34 to the terminal end 36 during operation. However, the most economical embodiment is diagrammatically illustrated in FIG. 2.

In the preferred embodiment, a return pulley 46 and winch 42 are shown attached by suitable means to the main frame 30. The return pulley 46b may be attached to a second brace 56 by a snap shackle and, positioned to direct the cable to the winch 42. The return pulley 46b is mounted on a pulley shaft 56 which is transversely affixed to the rails 32a, 32b at their terminal ends 36. Thus, the cable 44 winds from winch 42 through the slave pulley 46, passing between and generally parallel to rails 32a, 32b, below brace 64' to return pulley 46b. At this point, the cable 44 is reversed in direction by return pulley 46b, the cable 44 passing between rails 32a, 32b above pivot brace 64 and between ramps 38a, 38b to terminate at its first end 43, where it is attached to skid assembly 40'.

The skid assembly 40' comprises two skid plates 90a, 90b, each skid plate 90a, 90b including a lateral flange 95 to lip over the outside edges of rails 32a, 32b, for guiding skid plates 90a, 90b together over rails 32a, 32b. The skid plates 90a,90b are attached to one another by a support beam 92 which spaces apart the skid plates 90a, 90b by a predetermined distance to position each skid plate over rails 32a, 32b with flange 95 lipping its associated rail. A cable attachment point or aperture 100 disposed within the support beam 92 is provided transversely spanning the skid plates 90a, 90b. The first end 43 of cable 44 is attached centrally to beam 92 via aperture 100. A hook 99 may be attached to first end 43 for removable attachment of the cable 44 from point 100.

Two upright bars 96a, 96b optionally depend perpendicularly from the support beam 92 to provide a back rest against which a bale of hay rests. The upright bars 96a, 96b are advanced toward the terminal end 36 of the main frame as the cable 44 is winched; thus, after loading, the bars 96a, 96b push the entire load of bales B ahead of the bars 96a, 96b as all or a portion of a single bale B rests on top of the skid plates 90a, 90b. The remaining bales B in the load rest directly on rails 32a, 32b. An added brace 98' having a central rectangular bare extension 98a' may be attached co-planar to the bars 96a, 96b to form an open wall to prevent a bale B from rearwardly falling off the skid assembly 40. First and second rectangular collars 98b', 98c' disposed on brace 60 for insertably mounting the brace 98' in a stored configuration thereon.

Because bales of hay come in various rectilinear shapes, the frame 30 can be made adjustable in width with fence members 110, 111, however the frame 30 is dimensioned to span the range of these shapes as a fixed structural embodiment, but not limited thereto. This serves to alleviate the need for other adjustment mechanisms which drives up manufacturing cost to assist in the advancement of the bales B resting on the rails 32a, 32b towards ramps 38a, 38b.

To assist in the cleavage of bales of hay, a loading portal 70' is vertically swing-mounted near the terminal end 36 mounted on the bed frame for increased structural support and for reducing moments associated with the load force of impending bales in combination with the dynamic force of the motor and paddle unit on the portal frame 70' which provides a gate-like open frame for support of a striking device. The striking device of the preferred embodiment is a motor-driven paddlewheel 80 having rigidly attached flail arms 81. The paddlewheel 80 is horizontally and rotatably mounted on a rectangular and centrally open frame 82.

In the preferred embodiment, the open frame 82 includes a first upright member 84a and a second upright member 84b, and, an upper transverse member 86a. The upright and transverse members 84a, 84b, 86a form a π-shaped portal 70', thereby defining the open frame 82 and a central opening 88 of sufficient clearance diameter to permit passage or delivery of a bale of hay or flakes cleaved therefrom. As a consequence of the variously sized hay bales available commercially, the open frame 82 is dimensioned to accommodate a nominal range of bales of hay in its width dimension as a fixed structure. In particular, this nominal clearance can be around or about 5 feet.

Thus, the first and second upright members 84a, 84b are slidably mounted through rectangular collars 24a' and 24b' via corresponding first and second 89' and 120' rectangular tubing members disposed perpendicular with respect to respective members 84a and 84b via welds, respectively which eliminate in plane rotation which results in the tendency of the portal 70' to drop instead of rotating thereby producing an unwanted moment couple at the axis of rotation and along the length of the frame member 86a. Height adjustments of the portal frame 70' are made via tubular members 84a' and 84b' which are insertably and pivotally attached to members 84a and 84b to form a removable and rotatable portal 70' with a significant load reduction. At least one collar 87 manufactured of steel cylindrical tubing coaxially affixed, as by welding, to the cylindrical tubular post 84a' is utilized as a support base for the counting means 87a. The counting means is preferably a mechanical counter comprising a rectangular bar 200 having a predetermined length d pivotally attached to member 84a' via a spring loaded fastener assembly 202. The assembly 202 includes a first 204 and second 206 spring element having differing spring constants (k, N/m) for selectively expanding and contracting in response to and external force as needed, a threaded bolt fastener 208 and bar fasteners 210. Each spring is joined at a common end via fastener 208 to frame member 84a' and respective free ends secure via respective bar fasteners 210 to bar 200 as illustrated in FIG. 1. As with most material elements steel is the preferred material. Accordingly, the upright member 84a, is also manufactured of steel cylindrical tubing having an outer diameter matching the inner diameter of the collar 87. The upright member 84a may be then fixed at the desired height in its pivotal position by a collar, pin or other means 212 in a conventional manner. As suggested by FIG. 2, the open frame 82 is swing-mounted via post 89a' to permit movement from an open position to a closed position within the cylindrical steel tubing 84a.

The second upright member 84b is secured in a similar manner as member 84a via tubular post 120' which depends perpendicularly therefrom. The transverse members 86a depend perpendicularly from the first upright member 84a at opposing ends, and include a predetermined fixed width of around or about 5 feet. It should be understood by one of ordinary skill in the art that any width-can be adapted to the present invention depending on the intended use of the portal frame 70', however minimized mechanical parts significantly reduces material degradation or wear. Notwithstanding, a telescopic height-adjustments are made for the upright members 84a, 84b may be provided. Telescoping parts 108a, 108b may be used for each of the first and second upright members 84a, 84b, with appropriate height-fixing means to temporarily secure upright members 84a, 84b at the desired height, such as a pin, channel-lock, or other means 212 as known in the prior art.

The open frame 82 thus provides a support structure for the mounting of the paddlewheel 80, which is horizontally and rotatably mounted on a upper transverse member 86. Adjacent to this structure is a hay bale stabilizer bar mechanism 71, shaped to resemble a substantially inverted L-shaped structure having a plurality of prongs 73 disposed on a top end by suitable means which operatively function as hay rakes to guide the hay bale along the conveyor without hay bale dissolution. The stabilizer bar can be adjusted vertically via a single mechanical screw type fastener 75 or a plurality of such fasteners depending on the needed, and can be adapted to be mounted at different locations along the main frame 30 or fence position 111. The stabilizer 71 has been found to significantly improve hay bale and flake delivery without hay dissolution from retrograde motion. This minimizes the need for human effort to deliver loose hay which fails to flake or retain a sufficient compact bale.

In the preferred embodiment an electrically operable drive motor 130, having a drive shaft and sprocket unit 132, is affixed to the upper transverse member 86, the unit 132 shown coaxially oriented with the transverse member 86. Electrical circuitry and wiring 56 is operably tied to the remote control unit 54, including conventional circuitry, switches and wiring, to permit a remote user to activate the drive motor 130 from the cab of the vehicle. The control unit 54 may include selective switch positions, including a continuously-on mode, or, a pulse mode which allows the user to intermittently rotate the drive shaft and sprocket unit 132 of motor 130.

The paddlewheel 80 comprises a tubular sleeve 134, having a inner diameter approximating the outer diameter of the upper transverse member 86*a*, and rotatably slipped thereon. A retaining collar 170 prevents lateral movement of the sleeve 134 in a direction away from motor 130. The plurality of flail arms 81 are affixed to the tubular sleeve 134, and, comprise a support arm 136 depending diametrically outward from the tubular sleeve 134. Attached to each support arm 136 are paddle rods 138, which are attached coaxial with each of the ramps 38*a*, 38*b*, the upper transverse member 86*a*, and the drive shaft and sprocket unit 132 of the drive motor 130. A drive sprocket 140 is transversely attached to the tubular sleeve 134, and operably tied to the drive shaft and sprocket unit 132 by means of a drive chain 142.

In operation, the paddle rods 138 are rotated through a cylindrical path by means of the described linkages between drive motor 130 and the tubular sleeve 134, so that the rods 138 strike the top surface of bale B along a Line approximately coplanar with the stress line caused by the ramps 38*a*, 38*b*. The impact with the bale B thus accelerates flaking along the stress line of the bale B caused by the ramps 38*a*, 38*b*.

Figure 4:
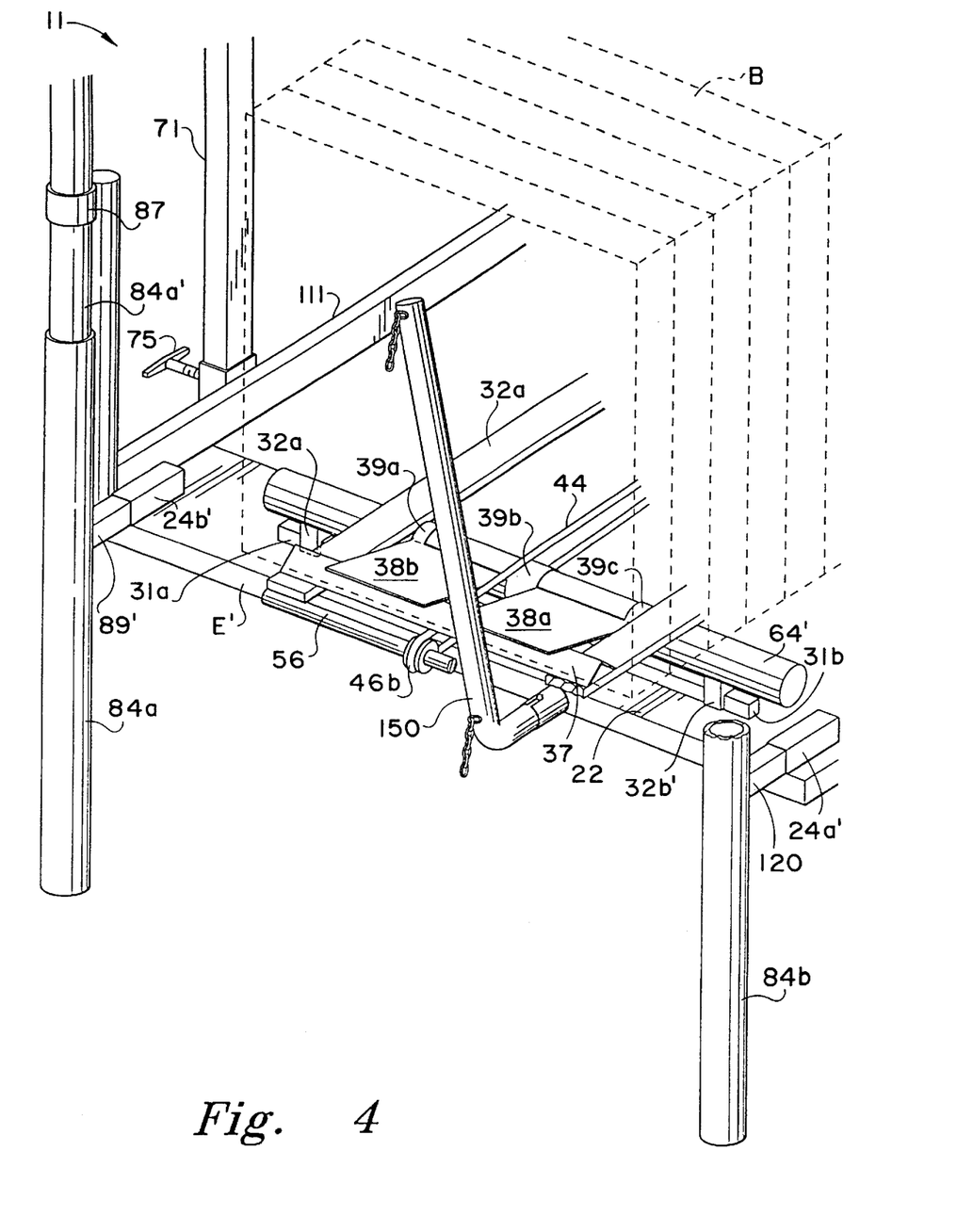
FIG. 4 is a fragmented, detail view of the adjustable ramps, the main operating frame of the mechanical hay distributor, and the hay flaking retainer arm which is set to selectively prevent hay distribution in a particular area.

For secure transportation of hay bales to and from a feeding area, a swing-mounted retaining arm 150 is attached to the terminal end 36 of the main frame 30. The retaining arm 150 is positioned to be rotated from a storage position below the terminal end 36 of the rails 32*a*, 32*b* to an up position, which occludes the opening 88 of the open frame 82 to prevent hay bales from unintentionally escaping from the load during transportation. As seen in FIG. 4, the retaining arm 150 comprises an L-shaped tube 152 having a free end 152*a* and an elbow end 152*b*. Each of a pair of safety chains 156*a*, 156*b* is attached proximate a different one of the free end 152*a* and the elbow end 152*b*. The free end 152*a* rests upon a first support bracket 160 depending from the terminal end 36, specifically from the pulley shaft 70.

At the elbow end 152*b*, the L-tube 152 is telescopically attached to a cylindrical stud 158, which in turn protrudes perpendicularly from a plate 161, in turn depending downward from the pulley shaft 56. The L-tube 152 thus is permitted to be reciprocally moved inward and outward (towards and away from the initial end 34, respectively), from the storage position to a swingable mode which permits the free end 156*a* to clear the terminal end 36 in its path of rotation. More specifically, the pulley shaft 70 of the terminal end 36 has a second support bracket 162 depending from the pulley shaft 70 at between the first support bracket and the plate 161, near plate 161. This second support bracket 162 must be cleared by the L-tube 152 during its rotation; however, upon moving the L-tube 152 inwardly after clearing the second support bracket 152, the L-tube 152 can be rested against the second support bracket 152, maintaining an upright orientation of the retaining arm 150 and occluding the opening 88. The safety chain 156*b* may then be latched onto a hook 170, also depending from the pulley shaft, to prevent inadvertent dislodging of the L-tube 152 from its upright position.

Moreover, such upright orientation of the retaining arm 150 not only permits the hay bales B from falling from the load during transportation, but also allows the skid assembly 40' to be secured to the main frame 30 when no load is carried. During no-load operation of the vehicle, the skid assembly 40 is positioned at its maximum travel distance towards the terminal end 36, where the safety chain 156 of the free end 152*a* can be attached to a part of the skid assembly 40', such as the one of the upright bars 96*a*, 96*b*.

Thus the hay distributor is adapted to distribute large rectangular bales individually or, in its preferred use, to flake off sections. The hay distributor can be used off the back of a pick-up truck or used on the sides or back of a flat bed truck. In operation, an operator of the vehicle remotely selects an on position for either or both of the winch motor and paddlewheel motor, choosing to run the motors continuously on, or, as a pulse operation to allow selective delivery of the flakes ac desired locations. The winch pulls the cable attached to the skid assembly, thus advancing the bale load by sliding them over the rails. A terminal bale in the load approaches the motorized rotating paddlewheel at the top of the frame, which strikes the top of the moving bale and flakes off sections hay from the bale at the cleavage line caused by the ramps. The hay distributor permits a single worker to safely drive a truck and distribute hay at the same time, with or without the portal frame member 70'.

The overall dimensions of the hay distributor 11 are typically eight feet long and three feet to five feet wide. Other preferred dimensions follow. Each rail 32*a*, 32*b* is four inches wide and is secured parallel to the other. The braces 60, 62, 64 are preferably two inch diameter iron tubing. Each skid plate 90*a*, 90*b* is 4"×4" when viewed in plan view. A 1"×4" angle iron forms the support beam 92, which is joined with a ⅞" iron rod formed into a triangle-shaped backing to define the upright bars 96*a*, 96*b*. The winch can include a mounting plate with dimensions including two inch angle iron and a base plate having dimensions of 2"×6" angle iron.

It is to be understood that the present invention is not limited to the embodiment described above, but encompasses any and all embodiments within the scope of the following claims.

We claim:

1. An improved hay distributor comprising, in combination with a vehicle bed:

a base plate adapted to be mounted to the vehicle bed;

a main frame mounted to said bed, said main frame having an initial end and a terminal end, and, further comprising a rail extending from said initial end to said terminal end;

a ramp transversely disposed in the path of said rail and affixed proximate said terminal end;

a skid assembly for guiding a bale along said rail from said initial end to said terminal end of said main frame; said skid assembly further comprises a stabilizing means for selectively stabilizing hay bales for flaking and a motor unit for advancing said skid assembly towards said terminal end of said main frame, and a counting means for counting a single dispensed flake of hay from the bale and for indicating a start and stop of at least one operative condition for said motor unit by an operator, the motor unit being operated via a remote control unit.

2. The hay distributor according to claim 1, wherein said ramp includes incline-adjustment means for altering the incline angle of the ramp.

3. The hay distributor according to claim 1, wherein said base plate includes a plate adapted for attachment to the edge of said vehicle bed and includes substantially rectangular collars for receiving a portal frame, and wherein said stabilizing means comprises a plurality of prongs for guiding a hay bale along a conveyor for subsequent flaking.

4. The hay distributor according to claim 3, further comprising a second rail spaced apart generally parallel from said rail, said rails joined by a plurality of support braces including a brace transversely attached to said rails at said terminal end of said main frame.

5. The hay distributor according to claim 4, wherein said brace includes an sleeve rotatably attached to said brace and said ramp, for altering the incline angle of said ramp, said rails further supporting a removable bar disposed beneath said ramp.

6. The hay distributor according to claim 4, wherein the skid assembly comprises two skid plates, each said skid plate including a lateral flange lipping over each said rail, and, an upright member for securing a bale during advancement of said skid assembly to thereby advance the bale with said skid assembly.

7. The hay distributor according to claim 1, wherein said motor unit includes a winch, a cable attached to said winch and said skid assembly, and a plurality of pulleys arranged to pull said skid assembly from said initial end to said terminal end.

8. The hay distributor according to claim 1, further comprising a loading portal having an open frame depending upwardly from said main frame for supporting a motor-driven paddlewheel over said rails and permitting passage of a bale;

said paddlewheel rotatably mounted on said open frame; and a drive motor for rotating said paddlewheel.

9. The hay distributor according to claim 8, wherein said remote control unit operates said drive motor.

10. The hay distributor according to claim 1, further comprising a fence spaced from said rail and for guiding a bale along said rail.

11. The hay distributor according to claim 10, further comprising a width-adjustment mechanism for changing the spacing of said fence from said rail.

12. The hay distributor according to claim 11, further comprising a loading portal having an open frame depending upwardly from said bed main frame for supporting a motor-driven paddlewheel over said rails and having an opening permitting passage of a bale, said open frame having a fixed width to correlate with a distinct position of said fence;

a paddlewheel rotatably mounted on said open frame; and a drive motor for rotating said paddlewheel.

13. The hay distributor according to claim 12, wherein said open frame includes an upright member attached to said main frame, an upper transverse member attached perpendicularly to said upright member, and wherein said paddlewheel comprises a sleeve rotatably attached to said upper transverse member, a support arm depending radially from said sleeve, and a paddle rod transversely attached to said support arm to align coaxially with both said ramp and said upper transverse member.

14. The hay distributor according to claim 12, wherein said main frame further comprises a hinge post depending upwardly from said fence, and said open frame is swing-mounted to said hinge post to permit movement from an open position to a closed position.

15. The hay distributor according to claim 14, further comprising a retaining arm swing-mounted to said main frame for occluding said opening of said loading portal when in a closed position.

16. An improved hay distributor comprising, a base plate adapted to be mounted to a vehicle bed;

a main frame mounted to said bed, said main frame having an initial end and a terminal end, and, further comprising a rail extending from said initial end to said terminal end;

a ramp transversely disposed in the path of said rail and affixed proximate said terminal end;

a skid assembly for guiding a bale along said rail from said initial end to said terminal end of said main frame; said skid assembly further comprises a stabilizing means for selectively stabilizing hay bales for flaking and a motor unit for advancing said skid assembly towards said terminal end of said main frame, and a counting means for counting a single dispensed flake of hay from the bale and for indicating a start and stop of at least one operative condition for said motor unit by an operator, the motor being operated via a remote control unit.

17. The hay distributor according to claim 16, wherein said ramp includes incline-adjustment means for altering the incline angle of the ramp.

18. The hay distributor according to claim 16, wherein said base plate includes a plate adapted for attachment to the edge of said vehicle bed and includes substantially rectangular collars for receiving a portal frame, and wherein said stabilizing means comprises a plurality of prongs for guiding a hay bale along a conveyor for subsequent flaking.

19. The hay distributor according to claim 18, further comprising a second rail spaced apart generally parallel from said rail, said rails joined by a plurality of support braces including a brace transversely attached to said rails at said terminal end of said main frame.

* * * * *